(12) United States Patent
Ma et al.

(10) Patent No.: US 12,147,141 B2
(45) Date of Patent: Nov. 19, 2024

(54) CHOLESTERIC DISPLAY WITH VIDEO RATE AND GRAY-SCALE IMAGE

(71) Applicant: HANWANG TECHNOLOGY CO., LTD., Beijing (CN)

(72) Inventors: Yao-Dong Ma, Frisco, TX (US); Lilya Darlene Ma, Frisco, TX (US); Blair Ma, Frisco, TX (US)

(73) Assignee: Hanwang Technology Co., Ltd., Beijing (CN)

( * ) Notice: Subject to any disclaimer, the term of this patent is extended or adjusted under 35 U.S.C. 154(b) by 0 days.

(21) Appl. No.: 17/842,318

(22) Filed: Jun. 16, 2022

(65) Prior Publication Data

US 2023/0408880 A1 Dec. 21, 2023

(51) Int. Cl.
*G02F 1/137* (2006.01)
*G02F 1/1335* (2006.01)
*G02F 1/1337* (2006.01)
*G02F 1/1368* (2006.01)

(52) U.S. Cl.
CPC .... *G02F 1/13718* (2013.01); *G02F 1/133514* (2013.01); *G02F 1/133531* (2021.01); *G02F 1/133742* (2021.01); *G02F 1/133753* (2013.01); *G02F 1/1368* (2013.01)

(58) Field of Classification Search
CPC .. G02F 1/13718; G02F 1/137; G02F 1/13306; G02F 1/133742; G02F 1/133753; G02F 1/1391; G02F 1/133528; G02F 1/133531
See application file for complete search history.

(56) References Cited

U.S. PATENT DOCUMENTS

| | | | |
|---|---|---|---|
| 2018/0217419 A1* | 8/2018 | Xie | G02F 1/134363 |
| 2019/0324302 A1* | 10/2019 | Fujiwara | G02F 1/133788 |
| 2020/0233254 A1* | 7/2020 | Ma | G02F 1/133553 |
| 2022/0350205 A1* | 11/2022 | Terashita | G02F 1/133707 |

* cited by examiner

*Primary Examiner* — Jonathan Y Jung
(74) *Attorney, Agent, or Firm* — Michael Fedrick; LOZA & LOZA, LLP

(57) ABSTRACT

The present invention relates to a TFT liquid crystal display, more specifically, to a cholesteric liquid crystal display employing both field-induced nematic vertical alignment texture and field-induced eddy alignment texture as video astable states and cholesteric planer texture and focal conic texture as power-free bistable states. Thus, the display provides not only video speed motion pictures with unlimited grayscale but also excellent static images.

14 Claims, 3 Drawing Sheets

CHOLESTERIC DISPLAY WITH VIDEO RATE AND GRAY-SCALE IMAGE

FIELD OF THE INVENTION

The present invention relates to a TFT liquid crystal display, more specifically, to a cholesteric liquid crystal display employing both field-induced nematic vertical alignment texture and field-induced eddy alignment texture as video astable states and cholesteric planer texture and focal conic texture as power-free bistable states. Thus, the display provides not only video speed motion pictures with unlimited grayscale but also excellent static images.

BACKGROUND OF THE INVENTION

Cholesteric liquid crystal displays are characterized by the fact that the pictures stay on the display even if the driving voltage is disconnected. The bistability and multistability ensure a completely flicker-free static display and have the possibility of infinite multiplexing to create giant displays and/or ultra-high-resolution displays. In cholesteric liquid crystals, the molecules are oriented in helices with a periodicity characteristic of the material. In the planar state, the axis of this helix is perpendicular to the display plane. Light with a wavelength matching the pitch of the helix is reflected and the display appears bright. If an AC voltage is applied, the structure of the liquid crystals changes from planar to focal conic texture. The focal conic state is predominately characterized by its highly diffused light scattering appearance caused by a distribution of small, birefringence domains, at the boundary between those domains the refractive index is abruptly changed. This texture has no single optical axis. The focal conic texture is typically milky-white (i.e., white light scattering). Both planar texture and focal conic texture can coexist in the same panel or entity. This is a very important property for display applications, whereby the gray scale can be realized.

Current cholesteric displays are utilizing "Bragg reflection", one of the intrinsic properties of cholesterics. In Bragg's reflection, only a portion of the incident light with the same handedness of circular polarization and also within the specific wave band can reflect to the viewer, which generates a monochrome display. The remaining spectrum of the incoming light, however, including the 50% opposite-handedness circular polarized and out-off Bragg reflection wave band, will pass through the display and be absorbed by the black coating material on the back substrate of the display to ensure the contrast ratio. The overall light utilization efficiency is rather low. The Bragg-type reflection gives an impression that monochrome display is one of the distinctive properties of the CLCD.

U.S. Pat. No. 5,796,454 introduces a black-and-white back-lit ChLC display. It includes a controllable ChLC structure, the first circular polarizer laminating to the first substrate of the cell which has the same circular polarity as that of the liquid crystals, the second circular polarizer laminating to the second substrate of the cell which has a circular polarity opposite to the liquid crystals, and a light source. The black-and-white back-lit display is preferably illuminated by a light source that produces natural "white" light. Thus, when the display is illuminated by incident light, the circular polarizer transmits the 50% component of the incident light that is right-circularly polarized. When the ChLC is in an ON state, the light reflected by the ChLC is that portion of the incident light having wavelengths within the intrinsic spectral bandwidth, and the same handedness; the light portion that is transmitted through the ChLC is the complement of the intrinsic color of ChLC. The transmitted light has right-circular polarization; however, it is thus blocked by the left-circular polarizer. Therefore, the observer will perceive that region of the display to be substantially black. When the display is in an OFF state, the light transmitted through the polarizer is scattered by the ChLC. The portion of the incident light that is forward-scattered is emitted from the controllable ChLC structure as depolarized light. The left-circularly polarized portion of the forward-scattered light is transmitted through the left-circular polarizer, and thus, is perceived by an observer. The black-and-white display, in the '454 patent, is generated by a back-lit component and the ambient light is nothing but noise.

U.S. Pat. No. 6,344,887 introduces a method of manufacturing a full spectrum reflective cholesteric display, which is incorporated herein by reference. '887 teaches a cholesteric display employing polarizers with the same polarity as liquid crystals. The display takes advantage of two reflections: Bragg reflection (the reflection) and metal reflection (the second reflection). The display utilizes a circular polarizer and a metal reflector film positioned on the backside of the display to guide the second component of the incoming light back to the viewer.

U.S. Pat. No. 6,873,393 introduces a method of fabricating a black and white or color cholesteric display without using Bragg reflection, which is incorporated herein by reference. '393 teaches a cholesteric display employing a front polarizer with the opposite polarity to that of liquid crystals. The function of the display cell structure is merely a light shutter to switch the incident light ON and OFF. In the black-and-white display mode, the white state is achieved from the metal reflection in the cholesteric planar texture area; and the black state is obtained by the cholesteric depolarization effect and polarizer's filtration effect in the cholesteric focal conic texture area. In the full-color mode, the full-color state is created by the metal reflector and the micro-color filter in the cholesteric planar texture area; and the black state is realized in the cholesteric focal conic texture area.

U.S. Pat. No. 7,564,518 introduces a reflective cholesteric display employing two circular polarizers. The front circular polarizer has a predetermined polarity that is opposite both to the Bragg reflection of the display and the back reflective circular polarizer. An absorptive weak polarizer with high transmittance is adopted in the display system. In the black-and-white display mode, the white state is achieved in the cholesteric focal conic texture area; and the black state is obtained in the cholesteric planar texture area. In the full-color mode, the full-color state is created by the micro-color filter in the cholesteric focal conic texture area; and the black state is realized in the cholesteric planar texture area.

US20200233254A1 introduces cholesteric displays employing a substrate with a mirror surface wherein a monostable liquid crystal structures, including field-induced nematic homeotropic texture and cholesteric focal conic texture, which is incorporated herein by reference.

SUMMARY OF THE INVENTION

It is the primary objective of the present invention to realize a high-frame-rate TFT cholesteric liquid crystal display.

It is another objective of the present invention to create an astable display during the video display.

It is also another objective of the present invention to utilize a bistable display during the power-free static display.

It is again another objective of the present invention to create a field-induced nematic eddy alignment texture as video optical ON and gray-scale states.

It is also another objective of the present invention to create a field-induced nematic vertical alignment texture as a video optical OFF state.

It is still another objective of the present invention to realize field-induced vertical alignment (FVA) display by means of linear polarizers.

It is yet another objective of the present invention to create a static OFF state in cholesteric planar texture.

It is also another objective of the present invention to obtain a static ON state in cholesteric focal conic texture.

It is again another objective of the present invention to accomplish a true full-color display.

It is the final objective of the present invention to convert an astable video motion picture into a bistable image.

DETAILED DESCRIPTION OF THE INVENTION

Figure 1:
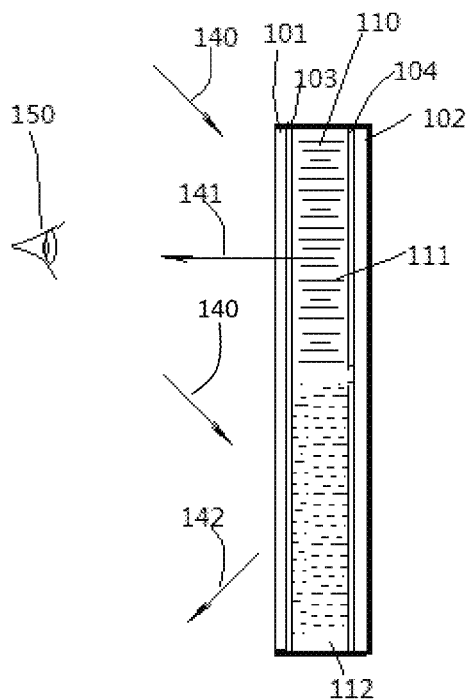
FIG. 1 illustrates a schematic structure of a prior art monostable black-and-white cholesteric display.

Referring first to FIG. 1, illustrated is a monostable black-and-white cholesteric display structure. A liquid crystal layer 110, including at least one stable focal conic texture area 111 and at least one unstable field-induced nematic vertical alignment texture area 112, is positioned between the transparent front substrate 101 with a transparent common electrode 103 and the translucent back substrate 102 with mirror pixel electrodes 104 to form a cell structure with the thickness in the range of 2-10 microns, more preferably, 2.5-3.5 microns. The front substrates 101 can be made of glass or plastic with a thickness in the range of 0.1-1.1 mm while the back substrate 102 can be made of glass, plastic, or metal with the same thickness range as the front substrate 101.

The display works in an optical ON state when the liquid crystal layer 110 is addressed in a focal conic texture area 111. The slant incoming light 140, passing through the transparent front substrate 101, is scattered into a diffusing light, wherein roughly 5% of it will be back-scattered to the viewer and 95% of it become forward-scattered light. As the forward-scattered light component hits on the mirror electrode 104, more than 90% of it will be effectively reflected toward the viewer. As a result, both the back-scattered light and the forward-scattered light will finally emerge to the viewer 150 as the natural light 141.

Accordingly, the display works in an optical OFF state when the liquid crystal layer 110 is addressed in a field-induced nematic vertical alignment texture area 112. This texture is unstable because if the field is switched off abruptly, the ChLC will return to the planar texture; and if the field is switched off slowly, on the other hand, the ChLC will return to the focal conic texture. As shown in FIG. 1, the slant incoming light 140, passing through the uniaxial liquid crystal 112, will be substantially bounced back on the mirror surface in a way of specular reflection to form the light 142. Based on the law of specular reflection wherein the angle of reflection equals the angle of incidence, if the viewer 150 looks at the display normally, there will be no light that can be discerned. Therefore, the display takes on sufficient black in the field-induced nematic texture area.

As a result of the monostable mode, the volatility of the field-induced nematic texture as the optical OFF state and the stability of the focal conic texture as the optical ON state construct a video speed black-and-white cholesteric display.

Please note that the above-mentioned prior art video speed display is of no intrinsic grayscale which now can be used as cartoon videos because there is either an optical ON state of cholesteric focal conic texture or an optical OFF state of the field-induced vertical alignment texture within an individual pixel. In other words, no intermediate brightness change is involved in a single pixel. Thus, to achieve a certain gray scale, one has to either sacrifice the image resolution by means of spatial mixing or reduce the frame rate by means of time mixing.

On the other hand, the response time from cholesteric focal conic to field-induced nematic is normally 5 ms, while the relaxation time of the phase change from field-induced nematic back to cholesteric is rather longer, which determines the maximum frame rate of the TFT monostable display.

Figure 2:
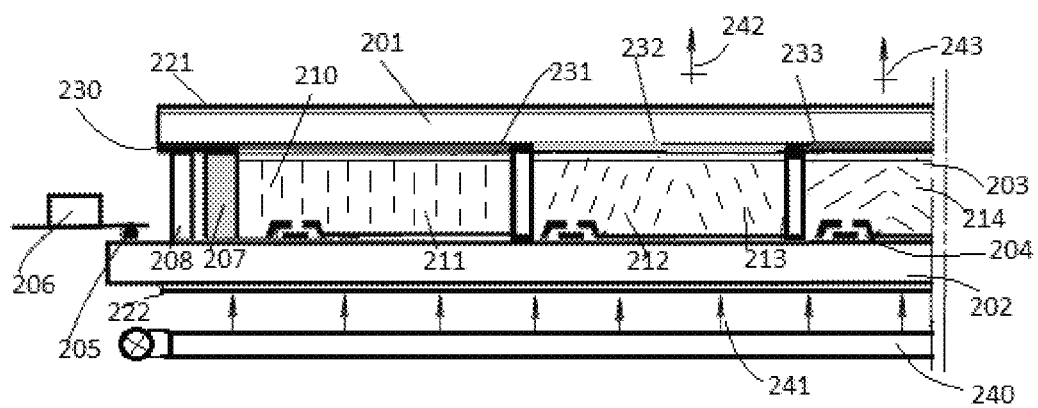
FIG. 2 illustrates a schematic structure of an astable back-lit transmissive full-color TFT cholesteric display.

Turning now to FIG. 2, illustrated is a sectional structure of a full-color display wherein an absorptive color filter 230 is deposited on the front substrate 201 and a common ITO electrode 203 is sputtered on the top of the color filter layer. The micro color filter array is of red 231, green 232, and blue 233 patternings. The thickness of the color filter is usually in the range of 0.4-1.2 micron, more preferably 0.8-1.0 micron. An ultra-thin polyimide alignment layer is deposited on the top of the color filter layer. Furthermore, a linear polarizer layer 221 is positioned and located at the outer side of the front substrate 201; a TFT active matrix 204 is fabricated on the inner side of the back substrate 202, and the second linear polarizer 222 on the outer side of the back substrate 202. The optical axes of the first polarizer 221 and the second polarizer 222 are designed in 90° or crossed to each other.

Within the TFT structure 204, a gate line that transmits scanning signals from the outside, a gate electrode which is a branch of the gate line, and a storage capacitor electrode that is parallel to the gate line are formed on the transparent insulating substrate 202 such as glass. A gate insulating layer is formed thereon. A data line, which is perpendicular to the gate line and transmits display signals from the outside, is formed on the portion of the gate insulating layer. A semiconductor and N+ layer is formed on the gate insulating layer and the gate electrode. A source electrode and a drain electrode are formed on the layer with Ohmic contact, and the source electrode is connected to the data line. Herein, the gate electrode, the source electrode, the drain electrode, the gate insulating layer, and the semiconductor and N+ layer form the TFT 204, and the channel of the TFT is generated in the portion of the a-Si layer between the source electrode and the drain electrode. When the scanning signal is applied to the gate electrode through the gate line, the TFT is turned on; and the display signal reaches the source electrode through the data line and then flows into the drain electrode through the channel in the a-Si layer.

As shown in FIG. 2, a seal ring 207 is printed on the surrounding four edges of the display to form a liquid crystal cell structure; a conductive silver dot 208 connects both the front and back panel as a common electrode. Finally, a data and power inputting flexible printing circuit board (FPC) 206 is interconnected to the display's driver IC chips (X-driver and Y-driver chips on glass COG) via an anisotropic conductive adhesive 205.

The display works in an optical OFF state in the red pixel area 231 when the liquid crystal layer 210 is addressed in a field-induced vertical alignment (FVA) texture 211 by a driving voltage $V_0$. A beam of backlight 241 out of a back-lit panel 240 reaches the linear polarizer 222 and converts into plane polarization. It will proceed to pass through the liquid crystal FVA texture without extenuation and phase change. Finally, the light component will be substantially absorbed by the front polarizer 221. Therefore, there will be no red light discerned by a viewer.

Likewise, the display works in an optical ON state with different gray scale levels in the green pixel 232 and blue pixel 233 when the liquid crystal layer 210 is addressed in a field-induced eddy alignment (FEA) texture 212, 213, and 214. The FEA textures 212 and 213, under the same driving voltage $V_1$, have the same tilting angle $\theta_1$ relative to the normal direction but different domain orientations. There are many domains in FEA wherein the inclination angle $\theta_1$ relative to the normal direction of the display is the same (as shown in FIG. 2) but the azimuth angle may be varied in the range of 0 to 180°. The inclination angle $\theta$ is an inverse function of the driving voltage, which is varied in the range of 0 to 90°. Therefore, the FEV texture 214 has a larger inclination angle $\theta_2$ addressed by a lower voltage $V_2$ compared with FEA textures 212 and 213. Liquid crystal eddies can be formed between the domains. The size and shape of the eddy depend on the driving voltage, surface alignment material, and elastic properties of the liquid crystals. Light scattering and depolarization are typical phenomena of the eddy effect. Please note that both the FVA texture and the FEA texture belong to electric-driven or field-induced nematic states. They are interchangeable simultaneously and instantaneously without any latency or relaxation process as described in FIG. 1. This is the principle of the astable display of the present invention.

A beam of light 241 out of a back-lit panel 240 reaches the linear polarizer 222 and more than 40% of it will convert to plane polarization. It travels through the liquid crystal FEA texture with a certain degree of diffusion and depolarization. Finally, the component will be substantially passing through the front polarizer 221 with controllable intensity and color tint. Generally, the larger the tilting angle is and the lower the voltage applied to it, the higher brightness of the emerging light will become. For example, blue light 243 is brighter than green light 242. In this way, a grayscale among the pixels 231, 232, and 233 is generated. As a result, there will be a color image discerned by a viewer.

Similarly, a monochrome display can be also made by using the above-mentioned display structure without employing the color filter layer in the front substrate. In this case, the total resolution of the monochrome will be three times higher than that of the same-size full-color version, which is especially useful for a projection display.

It is quite understandable in the field of cholesteric display that the linear polarizers 221 and 222 can be replaced by the circular polarizers with opposite polarity if the helical pitch of the cholesteric liquid crystal material is chosen in the visible wavelengths.

Compared with the prior art monostable display mode as shown in FIG. 1, wherein a nematic to cholesteric phase relaxation time is involved between optical ON and OFF states, the state-of-the-art display of the present invention provides a true video speed display with unlimited gray scales.

Figure 3:
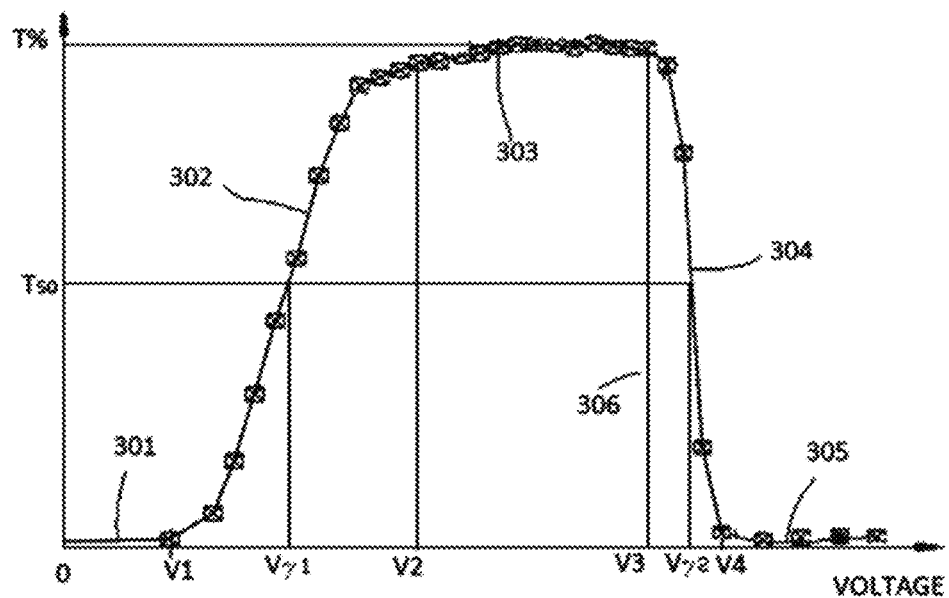
FIG. 3 illustrates an electro-optical response and driving principal of the astable and bistable dual-mode cholesteric display.

Turning now to FIG. 3, illustrated is an electro-optical (EO) curve of the transmissive TFT display as depicted in FIG. 2. The vertical axis represents the transmittance of the display, while the horizontal axis represents the voltage level of the driving waveform applied to the display. The meaning and functions can be described as follows:

1. Cholesteric Planar State 301

When the display is just fabricated out of the LCD production line, the initial state will be a cholesteric planar texture or an optical dark state. As the driving voltage ramps from zero up to the level of $V_1$ ($V<V_1$), the display remains in a stable planar state.

2. Cholesteric Planar to Focal Conic Transition 302

In the rising section of curve 302 with the voltage level between $V_1$ and $V_2$ ($V_1<V\leq V_2$), the cholesteric transition from planar state to focal conic state takes place. Within such a section the helical pitch of the cholesteric structure remains the same but its helical axis becomes more randomized as the increment of voltage increases. Here comes a planer and focal conic coexistent state. The transmission of the curve allows arranging many gray scales for a static display, which can be called multistability of the cholesteric display. The rising section of curve 302, herein named $\gamma_1$, has a positive slope.

3. Saturated Cholesteric Focal Conic State 303

Within the voltage range $V_2<V<V_3$, the display takes on a saturated cholesteric focal conic state and it has the highest brightness. The voltage $V_3$ can be also represented as $V_{th}$, the threshold voltage from cholesteric state to field-induced nematic state.

4. Field-Induced Eddy State 304

As the incremental voltage passes through $V_d$, the EO curve descends gradually from the optical ON state to the optical OFF state. This is a dynamic turbulent state energizing by the voltage V, wherein $V_3<V\leq V_4$. The brightness of the display is getting lower as the voltage increments. As shown in FIG. 2, the tilting angle $\theta$ of the liquid crystal molecules varies from 0 to $\pi$, as a function of the driving voltage. The transmission of the falling curve 304 can be allowed to arrange many gray scales of the astable display in the present invention. This section of the falling curve can be defined as $\gamma_2$, which is of a negative slope.

5. Field-Induced Homeotropic State 305

The field-induced homeotropic state can be also simplified as the "H" state in the field when the voltage runs over $V_4$ ($V\geq V_4$). In the "H" state the liquid crystal molecules are vertically aligned (VA) to the display's substrate so that the display takes on the minimum transmission or the optical OFF state.

6. Phase Dividing Line 306

The EO curve as shown in FIG. 3 can be divided into two parts by the phase dividing line 306. To the right of it is the field-induced nematic phase, wherein the astable display mode with video-rate and multiple gray scales can be achieved. To the left of it, on the other hand, is the cholesteric phase, wherein the bistable or multistable grayscale display mode can be obtained. The astable mode and bistable mode can be interchangeable via a fast path through the phase division line 306. The fast path represents a mechanism of relaxation from homeotropic section 301 to planar section 305. The molecular relaxation of liquid crystals is a bridge to link those two display modes. The relaxation process can be divided into four stages: First, a delay time, when the homeotropic structure is still present in the cell. Second, a fast relaxation period, when the transient planar structure is formed. Third, when the equilibrium pitch is reached. Finally, a period of slow relaxation, when the final planar structure is formed. Initially, the liquid crystal goes from the homeotropic through an intermediate conic structure to the quasi-equilibrium transient planar state by changing the polar angle of director orientation (angle between director and normal to the cell surface) from 0 to $\pi/2$ (about 1.25 ms). The fact that the relaxation to equilibrium wavelength is completed in about 10 ms means that the equilibrium cholesteric pitch is reached and the next relaxation process is only macroscopic structure changes. The interval of relaxation time is from 0.5 ms to 10 ms after the electric field is removed.

Based upon above-mentioned the EO curve, the driving means of the astable video display can be described as follows:

1. Initiating

Whether the display is brand new from the display manufacturer or in a power-free standstill state, a voltage pulse, which is higher than $V_4$ with a sufficient pulse width, is applied onto all pixels of the display panel to set the display into a black field-induced homeotropic state. The initiating time doesn't affect the video frame rate at all since it is a part of the pipeline waveform 2. Frame Addressing All levels of analog signals with the voltage level in the range of curve $\gamma_2$ ($V_3<V\leq V_4$) are latched out to every individual TFT source electrode of the sub-pixel in a line-to-line scanning sequence controlled by the TFT gate signals. Liquid crystal molecules in the TFT array will be addressed into predetermined optical ON, OFF, and/or gray scales instantaneously. The gray scales or total colors are determined by both hardware ladder circuits and pulse width modulation (PWM). For example, if the ladder circuit, including a series of resistors and an Op-Amp IC, generates 64 voltages: $v_0$, $v_1$, $v_2$, $v_i$, ... $v_{63}$, and the PWM provides 4 levels of Vrms, the resultant gray scales for each color are 256. There are red, green, and blue three primary colors for the color reproduction, so the total number of colors in the display will be over 16 million. The bias voltage $v_i$ (i=0~63) of the ladder circuit represents the gray scale voltage according to the curve $\gamma_2$. The values of resistors are determined by the $\gamma_2$ correction to achieve a linear grayscale to the human eyes.

3. Frame Sequencing

While displaying the current image, the next frame data are restored in the frame buffer transferred from a shift register and a DA (data to analog) converter. To offset the DC (direct current) component, frame-to-frame or line-to-line inversion may be used in the driving scheme. The frame rate can be in the range of 30~140 frames per second (FPS), most preferably 60~100 FPS. Please note that the present driving means work in the field-induced nematic state without phase changing and relaxation as occurred in the prior art monostable display.

4. Dual-Mode Converting

When the astable video display is switched to the bistable display, a control signal will send to the frame buffer to lock down the predetermined image, to switch the ladder circuit from curve $\gamma_2$ ($V_3<V\leq V_4$) to curve $\gamma_1$ ($V_1<V\leq V_2$) and to set all the liquid crystal pixels from the field-induced nematic state into the cholesteric planar state simultaneously via the fast path. The display will be ready to address the designated static image:

Consequently, all levels of analog signals with the voltage level in the range of curve $\gamma_1$ ($V_1<V<V_2$) are latched out to every individual TFT source electrode of the sub-pixel in a line-to-line scanning sequence controlled by the TFT gate signals. Liquid crystal and/or gray scales instantaneously. The gray scales or total colors are determined by both hardware ladder circuits and PWM. For example, if the ladder circuit, including a series of resistors and an Op-Amp IC, generates 64 voltages: $v'_0$, $v'_1$, $v'_2$, $v_i'$ ... $v'_{63}$, and the PWM provides 4 levels of Vrms, the total number of colors will be over 16 million. The bias voltage $v'_i$ (i=0~63) of the ladder circuit represents the gray scale voltage according to the curve $\gamma_1$. The values of resistors are determined by the $\gamma_1$ correction to achieve a linear grayscale to the human eyes. As soon as the final lines' data addressing is completed, the image is fixed by switching all sub-pixels abruptly and simultaneously into zero voltage. As a result, the power-free bistable image will be discerned by a viewer.

From FIG. 3 one can appreciate that curves $\gamma_1$ and $\gamma_2$ are different ($v'_i\neq v_i$), the former is positive while the latter is negative. Given a certain display transmission, $T_{50}$ for example, there are two voltages led out from the ladder circuit $V_{\gamma 2}$ and $V_{\gamma 1}$ respectively. The first is used for the video speed astable addressing and the second for the static bistable image addressing.

The dual-mode display allows a wide range of frame rate modulation from 0 to 140 FPS, which is superior to any other current available displays, including E-ink displays, OLED displays as well as normal LCDs. Zero FPS full-color display is ideal for a novel e-book, where low power consumption, no flicker, and low human eye fatigue are crucial parameters to the end-users, Furthermore, the 140 FPS display meets the standard of the game display and ultra-high-speed video displays. This will be a watershed in the cause of the development of advanced display technologies. It indeed represents a new trend in the information industry.

Figure 4:
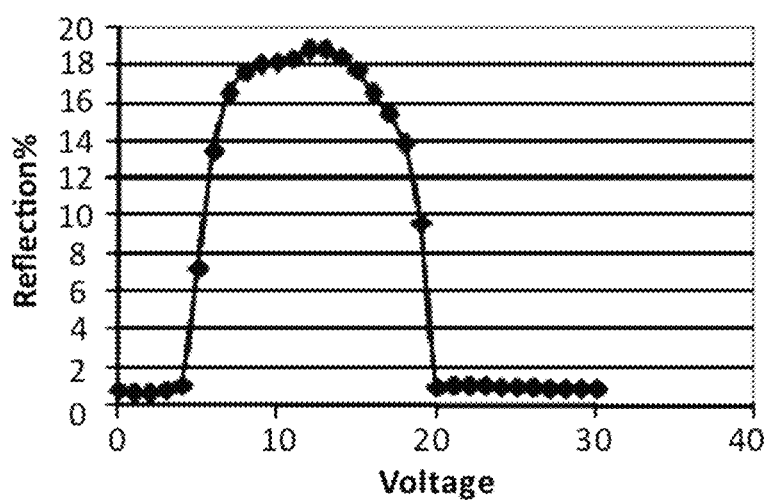
FIG. 4 illustrates an electro-optical response curve of a reflective monochrome cholesteric display.

Turning now to FIG. 4, illustrated is an EO curve of a monochrome display made by using the display structure as shown in FIG. 2 without employing the color filter layer in the front substrate and with a reflective polarizer positioned in the back substrate. Thus, the vertical axis of the curve represents the reflectivity of the display. In this case, there is no backlighting involved in the display structure. However, besides the reflective polarizer, a commercially available half-transmissive and half-reflective polarizer can be attached to the back substrate to realize a so-called transflective monochrome display. Likewise, a transflective full-color display mode can be also achieved by the same half-transmissive and half-reflective polarizer arrangement, which is beneficial for the sunlight-readable astable and bistable display modes.

Figure 5:
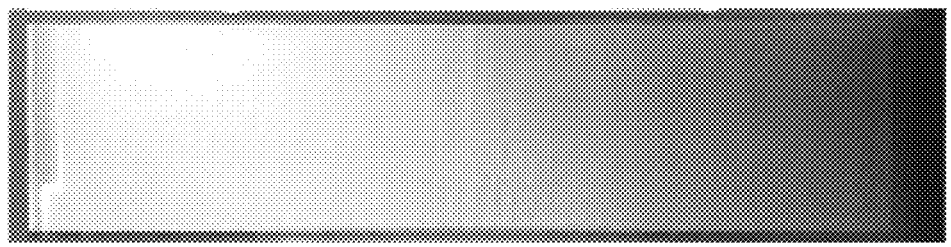
FIG. 5 illustrates a picture of the grayscale image of an actively addressed full-color cholesteric display.

Turning now to FIG. 5, illustrated is a picture of the grayscale image of an actively addressed astable full-color cholesteric display. The display was fabricated in a TFT LCD production line and the optical test was carried out in an optical lab. The display was a 4.6" diagonal, 640×150 resolution, and full-color a-Si TFT panel.

Figure 6:
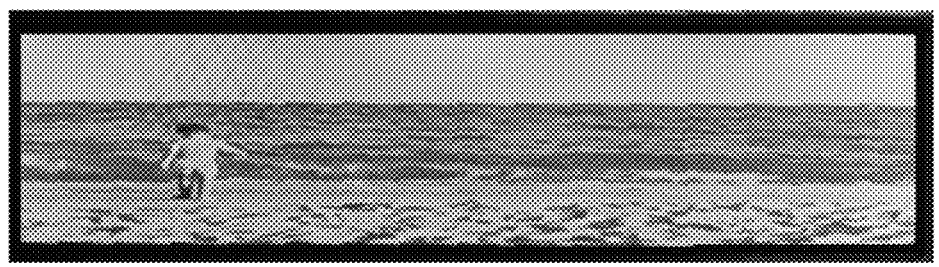
FIG. 6 illustrates a picture of video speed astable TFT cholesteric display.

Turning now to FIG. 6, illustrated is a picture of video speed astable TFT cholesteric display. The quality of display is comparable to the currently available SVA (super vertical alignment) LCD monitor or TV. Generally, the optical behavior of SVA is almost the same as FVA of the present invention in terms of contrast and viewing angle. The difference, however, is that the former LCD contains nematic material with a negative dielectric anisotropy while the latter is a cholesteric material with a positive dielectric anisotropy.

Although the present invention and its advantages have been described in detail, those skilled in the art should understand that they can make various changes, substitutions, and alterations herein without departing from the spirit and scope of the invention in its broadest form.

What is claimed is:

1. An astable cholesteric display comprising:
   a. a front transparent conductive substrate,
   b. a front polarizer layer,
   c. a cholesteric liquid crystal layer with at least one field-induced vertical alignment area and one field-induced eddy alignment area,
   d. a back active-matrix substrate,
   e. a back polarizer layer, and
   f. a back-lit panel,
   wherein the front transparent conductive substrate with the front polarizer layer, the cholesteric liquid crystal layer, and the back active-matrix substrate with the back polarizer layer are juxtaposed to form a display structure; wherein a light beam from the back-lit panel passing through the field-induced eddy alignment area is modulated as a polarized light to form an optical ON state with at least one grayscale; and wherein the light passing through the field-induced vertical alignment area is substantially absorbed by the front polarizer layer and the back polarizers layer to form an optical OFF state, wherein the field-induced vertical alignment area and the field-induced eddy alignment area are instantaneously interchangeable at video frequency, whereby a viewer will observe a high frame-rate black-and-white motion picture.

2. The astable display according to claim 1, wherein the front polarizer layer and the back polarizer layer are linear polarizers with polarizing axis crossing each other.

3. The astable display according to claim 1, wherein the front polarizer layer and the back polarizer layer are circular polarizers with opposite polarity.

4. The astable display according to claim 1, wherein the field-induced vertical alignment area is in a nematic homeotropic phase.

5. The astable display according to claim 1, wherein the field-induced eddy alignment area is in a nematic tilting phase.

6. The astable display according to claim 1, wherein the field-induced eddy alignment area is of multiple liquid crystal domains.

7. The astable display according to claim 6, wherein the multiple domains are of the inclination angle $\theta$ varied in the range of 0 to 90° and the azimuth angle varied in the range of 0 to 180° respectively.

8. The astable display according to claim 1, wherein the display is a transmissive display.

9. The astable display according to claim 1, wherein the display is a transflective display.

10. The astable display according to claim 1, wherein the display is a reflective display.

11. The astable display according to claim 1, further including a color filter at the front transparent conductive substrate to achieve a full-color display.

12. The astable display according to claim 1, wherein the display is of a video speed in the range of 30 to 140 FPS.

13. An astable hybrid cholesteric display comprising:
    a. a front conductive color-filter substrate,
    b. a front polarizer layer,
    c. a cholesteric liquid crystal layer with at least one field-induced vertical alignment area and one field-induced eddy alignment area in an astable mode and at least one cholesteric planar area and one cholesteric focal conic area in a bistable mode, and
    d. a back active-matrix substrate,
    e. a back polarizer layer, and
    f. a back-lit panel,
    wherein the front conductive color-filter substrate with the front polarizer layer, the cholesteric liquid crystal layer, and the back active-matrix substrate with the back polarizer layer are juxtaposed to form a display structure; wherein a light beam from the backlighting panel passing through the field-induced eddy alignment area and/or through the field-free focal conic area are modulated as a polarized light to form an optical ON state; and wherein the light passing through the field-induced vertical alignment area and/or field-free planar area are substantially absorbed by the front polarizer layer and the back polarizers layer to form an optical OFF state, whereby a viewer will observe a video display and a static display respectively.

14. The astable hybrid cholesteric display according to claim 13, wherein the video display and the static display are dual-mode cholesteric displays.

* * * * *